June 6, 1972 — O. CERPELLI — 3,667,879
SCREW PUMP
Filed Feb. 10, 1970
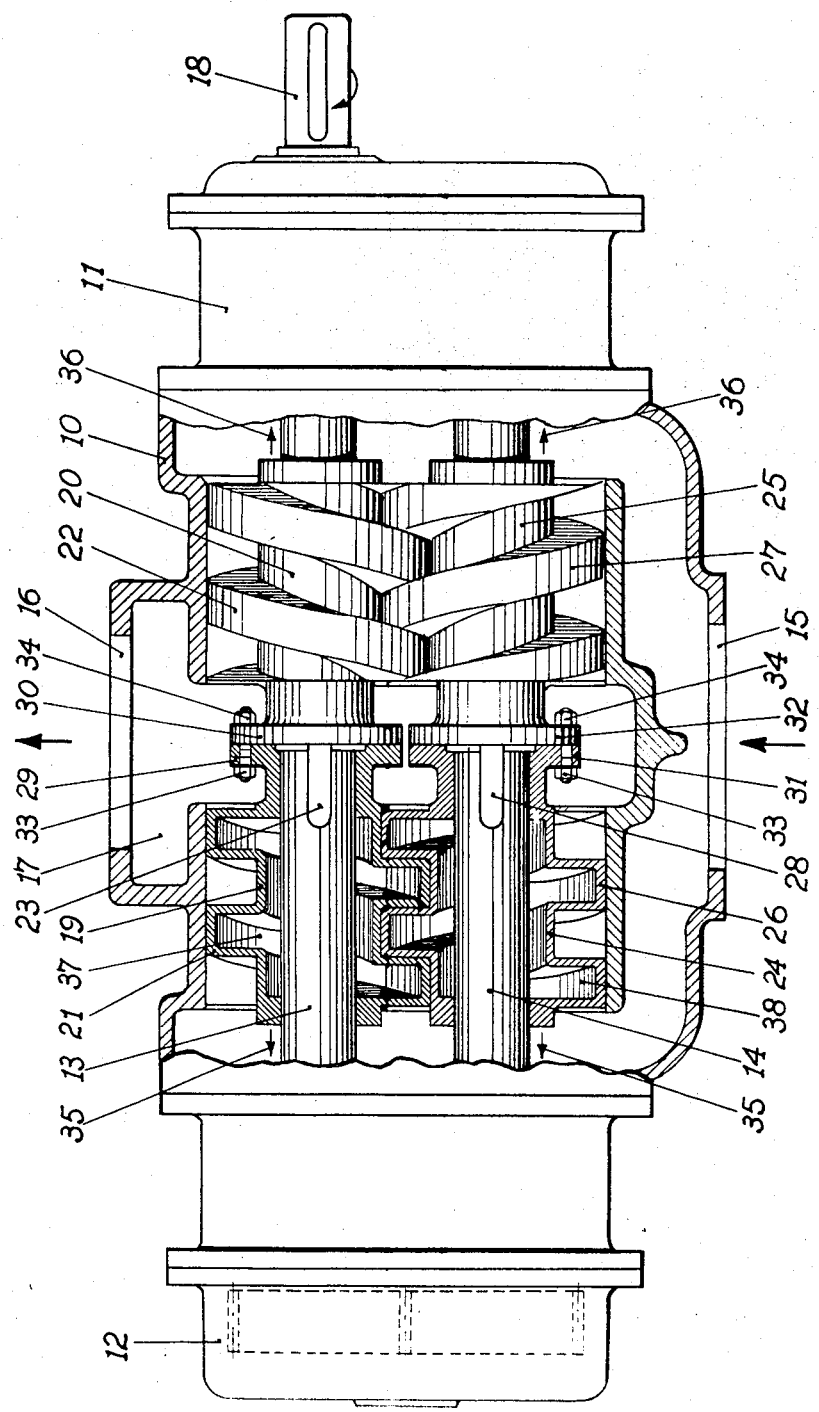
INVENTOR
Orazio Cerpelli
BY
Dedio and Montgomery
ATTORNEYS

3,667,879
SCREW PUMP
Orazio Cerpelli, 4 Via Giotto, Viareggio, Italy
Filed Feb. 10, 1970, Ser. No. 10,209
Claims priority, application Italy, Feb. 12, 1969,
34,901/69
Int. Cl. F01c *1/16;* F03c *3/00;* F04c *1/10*
U.S. Cl. 418—202    3 Claims

ABSTRACT OF THE DISCLOSURE

A pump of the screw type having a pair of screws of opposite pitch and means for securing together each screw as a pair on the same shaft so that axial thrust is withstood by said securing means.

---

This invention is for improvements in or relating to screw pumps.

The screws of high-capacity screw pumps are not of course unitary with the pump shafts but are iron or bronze or steel or stainless steel castings which are keyed to the primary and secondary shafts of the pump so as to rotate solidly therewith.

As a rule, two screws are mounted on each shaft; the screw ends abut one another and the screws have screwthreads to opposite hands. The shafts are mounted in parallel spaced-apart relationship to one another so that the two screws on the main shaft engage with the two screws secured to the secondary shaft. In operation screws thus mounted would tend to move on the shafts axially away from the centre towards the ends of the shafts; the conventional way of preventing this is to secure the screws rigidly to the shafts to prevent displacement of the screws thereon; for instance, screwthreaded rings are used which are placed on the shafts at the outer ends of the screws.

Securing the screws to the shafts of pumps of this kind in this was is unsatisfactory, since the screwthreaded nuts intended to secure the screws axially cannot withstand the axial thrust which they experience as a result of hydraulic pressure and of differing heat expansion of the various materials used an of the differing shapes of articles made of the same material. This axial thrust, which is very strong even though of the order of only a few tenths of a millimetre, distorts the screwthreaded thrust rings by an upsetting action, so that the securing of the screws slackens and the screw inner ends which were originally in contact with one another cease to be so. Even when the heat expansion of the shafts is greater than the heat expansion of the screws, the screw inner ends still disengage from one another as a result of the hydraulic pressure in the delivery chamber, and the securing slackens. Also, the need for the thrust ring to be screwthreaded means that the diameter of the shafts must be reduced, with a resulting weakening in bending and twisting. The axially outwards shift of the screws permitted by the thrust nuts causes increased rubbing between the screwthreads of the meshing screws, so that the engaging surfaces wear rapidly and the working life of the screws is reduced.

It is an object of this invention to obviate these disadvantages by using appropriate means to provide central securing of the screws.

For a better understanding of the invention and to show how the same may be carried into effect, reference may now be made to the single figure which forms the accompanying drawing and which is a view partly in section, and purely by way of non-limitative example, of an embodiment of the invention.

A high-capacity pump according to this invention mainly comprises a casing 10 having two end cover plates 11, 12 and receiving a primary shaft 13 and, parallel thereto, a secondary shaft 14. The casing 10 is formed with an intake orifice 15 and a delivery orifice 16, the latter communicating with a delivery chamber 17. End 18 of primary shaft 13 extends out of pump casing 10 for connection to drive means (not shown).

Two screws 19, 20 having respective screwthreads 21, 22 are mounted on the primary shaft 13; the two screwthreads are to opposite hands. The screws 19, 20 are rigidly secured to shaft 13 by a key 23 and rotate solidly with shaft 13. Two screws 24, 25 having respective screwthreads 26, 27 are mounted on secondary shaft 14; the screwthreads 26, 27 are to opposite hands. The screws 24, 25 are connected to secondary shaft 14 by a key 28 and rotate solidly with shaft 14. As the drawing shows, the screw 19 engages with the screw 24 by way of the respective screwthreads 21, 26, and the screw 20 engages with the screw 25 by way of the respective screwthreads 22, 27.

For satisfactory operation of the pump, the screws, as well as being rigidly secured to the shafts by the keys, must also be secured axially against a central shoulder or abutment on the shafts; according to this invention, this is achieved by the inner ends of the screws 19, 20 and 24, 25 having unitary flanges 29–32 respectively. The same are formed with matching axial apertures receiving bolts 33 secured by nuts 34.

Thanks to this feature, which obviates the screwthreaded end rings of the conventional constructions, the screws can expand axially from the centre in the direction indicated by arrows 35, 36 and are therefore free to shift on the shafts 13, 14 without their heat expansion damaging the elements—i.e., the bolts 33—which secure the screws axially.

As can readily be seen in the sectioned portion of the drawing, to reduce weight the screws 19, 20 and 24, 25 are internally hollow, as indicated by references 37, 38.

This invention has been disclosed with particular reference to a particular embodiment, but can be varied by the skilled addressee without such variations departing from the scope of the invention.

What I claim is:

1. In a high-displacement positive-displacement pump having a casing closed at its ends by two cover plates, the casing defining an intake chamber and a delivery chamber, a primary shaft and a secondary shaft rotatably mounted in the casing and disposed parallel to one another, with one end of the primary shaft extending out of the casing for connection to driving means, two screws which have screwthreads to opposite hands being mounted on and secured to the primary shaft for solid rotation therewith, two screws which have screwthreads to opposite hands being mounted on and secured to the secondary shaft for solid rotation therewith, the pair of primary-shaft screws being engaged with the pair of secondary-shaft screws, and connecting means operatively connecting the inner ends of the screws comprising each pair of screws on the primary shaft and on the secondary shaft whereby the screws comprising each said pair are maintained in contact with one another at their inner ends, said connecting means being adapted to withstand the axial thrust which is produced by heat expansion and by hydraulic pressure and which tends to disengage the screw inner ends from one another, so that the screws are free to expand and to shift on the shafts.

2. A pump according to claim 1 wherein the connecting means comprise a flange unitary with the inner end of each screw, each flange being formed with a number of matching axial apertures, the connecting means also comprising bolts which are received in the axial apertures in the flanges and which are secured by nuts, the bolts interconnecting the inner contacting flanged ends of each pair of screws and withstanding the axial thrust tending to separate the screws from one another, so that the screws are free to expand and shift on their shafts.

3. A pump according to claim 1 wherein each said pair of screws is secured to its respective shaft by a key.

References Cited

UNITED STATES PATENTS

| | | | |
|---|---|---|---|
| 1,765,694 | 6/1930 | Osgood | 418—201 X |
| 1,836,249 | 12/1931 | Holmes | 418—201 X |
| 2,586,842 | 2/1952 | McCallum | 418—201 X |

CARLTON R. CROYLE, Primary Examiner

J. J. VRABLIK, Assistant Examiner